Patented Mar. 30, 1937

2,075,252

UNITED STATES PATENT OFFICE 2,075,252

MODIFIED HALOGEN CONTAINING BUTADIENE BODIES

Herbert A. Winkelmann, Chicago, Ill., assignor to Marbon Corporation, a corporation of Delaware No Drawing. Application May 10, 1935
Serial No. 20,894

5 Claims. (Cl. 260—1)

This invention relates to halogen containing butadiene polymers, and more particularly to the preparation of modified butadiene polymer hydrohalide compositions.

Halogen containing butadiene polymers such as halogenated rubber, hydrohalogenated rubber, halogenated rubber hydrohalides, hydrohalogenated rubber halides are in general relatively unstable materials and decompose readily under the influence of heat and mechanical treatment such as is produced during any kneading or dry mixing operation. For this reason, except by solution methods or by the use of stabilizers such as disclosed in my copending application, Serial No. 11,665 it is practically impossible, as far as is known, to produce homogeneous neutral mixtures of such halogen containing butadiene polymers and other materials.

It is an object of this invention to produce homogeneous undecomposed mixtures of halogen containing butadiene polymers and modifiers such as plasticizers and hardeners.

A further object is the economical production of sheets suitable for shipment and sale for master batching purposes.

Another object is the production of mixtures of rubber hydrochlorides and large proportions of resin plasticizers, pigments and the like, which sheets are readily dispersible in solvents for the production of cements, lacquers and other coating compositions.

Another object is the production of integral mixtures suitable for molding and calendering Other objects will become apparent on reading the specification.

In the present invention butadiene polymers such as rubber are homogeneously mixed with modifiers of such character and in such amount that the mixture remains a solid or at least is not so fluid that it cannot be handled as an integral piece. The homogeneous mixture is then reacted with a halogen, a hydrogen halide or a mixture of any halogen and hydrogen halide, which may be in the liquefied or gaseous state, at high or low temperatures, under pressure or at atmospheric pressure. The reaction may be allowed to go to completion or stopped at some point of partial saturation.

The following examples are given as illustrations of the invention:

Example I 100 parts by weight of rubber in sheets about .02" thickness are milled with 25 parts of chlorinated paraffin to produce a homogeneous integral mixed mass in sheet form. This mixture is then subjected to liquefied hydrogen chloride at about —85° C. for about fifteen minutes. The sheets expand to some extent on removal from the bath, but to a much lesser extent than when the chlorinated paraffin, which is a latent solvent, is not present, and on standing the sheets contract into a mass of even greater apparent density. These sheets of plasticized rubber hydrochloride may be rolled or calendered into thinner sheets as for example .001" thickness. Preferably a stabilizer, as disclosed in my copending application, Serial No. 11,665, such as magnesium oxide, is incorporated before calendering. The sheets of such plasticized rubber hydrochloride are transparent and elastic. The amount of chlorinated paraffin may be varied within wide limits but for practical purposes the lower limit for noticeable plasticizing effect may be taken as about 5 parts by weight to 100 parts of asymmetrical rubber hydrochloride, and about 10 parts for other types of rubber hydrochloride. The upper limit may be considered as the maximum amount which can be retained by the rubber. In place of chlorinated paraffin there may be used pine tar, butyl stearate, amyl benzene with similar results. Dibutyl phthalate, petroleum hydrocarbons, octyl acetate, halowax and many resins are also operative, such as glyceryl phthalate resins, cumarone indene resins, mixtures of ortho and para toluene ethyl sulfonamides and coal tar distillates. Where the plasticizer is reactive with hydrogen chloride the reaction is preferably carried out at low temperatures, but it is not necessary that the reaction be retarded or prevented as the hydrochlorinated plasticizers are themselves good plasticizers. In place of high boiling latent solvents and plasticizers the low boiling solvents, such as chloroform, ethylene dischloride etc., may also be incorporated with the rubber and the mixture reacted with hydrogen chloride. With hydrohalogenated butadiene polymers and with halogen containing butadiene polymers in general in which there is a possibility that a halogen or hydrogen atom may add to one or the other of two carbon atoms of a butadiene polymer the presence of solvents or latent solvents with the butadiene polymer may cause a different orientation or positioning of the atoms which may result in different properties of the resulting rubber hydrohalides and rubber made therefrom. In general the incorporation of solvents in rubber before the reaction with hydrogen halides or halides minimize decomposition of the resulting rubber halide or rubber hydrohalide on any subsequent heat or mechanical treatment. Although solvents and latent solvents are preferred, the use of liquids and low melting materials in general are useful where the rubber hydrochloride is to be given a heat or mechanical treatment. Many materials are plasticizers for some of the halogen containing butadiene polymer and have little or no effect on other halogen containing butadiene polymer so that where materials are being incorporated with rubber in order to obtain flexible halogen containing rubber bodies care must be taken to choose the proper kind and amount of plasticizer.

Example II 100 parts of rubber in sheets of about .02" thickness are milled with 50 parts of a viscous fluid resin such as the modified glycerol-phthalic anhydride resin known as rezyl, 2 parts of paraffin and 100 parts of titanium oxide pigment. The milled mixture is reacted with gaseous hydrogen chloride at about $-50°$ C. under pressure of about 40 pounds per square inch, or at approximately equilibrium conditions. After about two hours the mass is removed and added to a solution of about 250 parts of ethylene dichloride. On agitation a solution is readily obtained which may be used for various coating purposes. Instead of gaseous hydrogen chloride at low temperatures, liquefied hydrogen chloride at low temperatures may be used, and for less soluble products gaseous or liquefied hydrogen chloride at higher temperatures such as room temperature may be used.

Example III 100 parts of rubber are milled with 100 parts of polymerized chloroprene to obtain a homogeneous mixed integral mass. The mixture is reacted with gaseous hydrogen chloride at room temperature under approximately 600 pounds per square inch pressure for two hours. The milled mixture may also be reacted with hydrogen chloride in the liquefied or gaseous condition, at low temperature or high temperature under various pressures. Fillers, plasticizers and the like may be incorporated with the rubber and polymerized chloroprene and the mixture reacted with hydrogen chloride. The polymerized chloroprene has a definite plasticizing effect on the rubber hydrochloride. Since the polymerized chloroprene reacts slower with the hydrogen chloride than the rubber, various mixtures of rubber, rubber hydrochloride, polymerized chloroprene and polymerized chloroprene hydrochloride may be produced by varying the time of contact with the hydrogen chloride.

Example IV 50 parts of pale crepe rubber are milled with 50 parts of neutral inner tube reclaim to obtain a homogeneous integral mixture. The mixture is calendered to about .02" and the thin sheets are reacted with liquefied hydrogen chloride at about $-85°$ C. for five minutes. A sheet is obtained of low apparent density, and containing a homogeneous mixture of crude rubber hydrochloride and reclaimed rubber hydrochloride. This material is then milled with 10 parts by weight of magnesium oxide, 10 parts by weight of lead oxide, and 10 parts of F. F. rosin. A dense homogeneous pliable mass is obtained which is definitely softer and more flexible than rubber hydrochloride made from crude rubber alone. Although an acid or neutral reclaim is preferred and gives products of superior resistance, alkali reclaim may be used. Instead of reacting the rubber and reclaim with liquefied hydrogen chloride at $-85°$ C., it may be reacted at other temperatures and pressures with the production of products of increased resistance to oils and solvents as the temperature is increased. Gaseous hydrogen chloride under pressure reacts similarly to liquefied hydrogen chloride. The proportion of reclaim and rubber may be varied widely, for example from 10% to 90% reclaim may be used.

Example V 100 parts of rubber are milled with 25 parts of a highly chlorinated diphenyl. The resulting mixture is subjected to hydrogen chloride in the liquefied or gaseous state but preferably with liquefied or gaseous hydrogen chloride at above $-35°$ C. at or near equilibrium pressure. After about 15 minutes with the liquefied hydrogen chloride or about two hours with the gaseous hydrogen chloride the reacted material is removed and milled, molded or calendered, preferably with stabilizer such as magnesium oxide.

Example VI 100 parts by weight of rubber in sheet form are milled with 100 parts of carbon black and 20 parts of butyl stearate to produce a homogeneous integral sheet. These sheets are then directly subjected to hydrogen chloride at room temperature, the hydrogen chloride being in the liquefied condition or gaseous condition under pressure. After about 15 minutes with the liquefied hydrogen chloride or about two hours with the gaseous hydrogen chloride under equilibrium pressure the sheets are removed. A sheet composed of an intimate mixture of rubber hydrochloride, carbon black and plasticizer is obtained which may be rolled into bundles for shipment and used for master batching purposes as, for example, milling with straight rubber hydrochloride or rubber chloride preferably with a stabilizer. Master batches may also be made by the above method containing large proportions of inert pigments such as lead chromate or organic dyes which are unaffected by hydrogen chloride. Blanc fixe, clay, slate flour, white substitute and brown substitute may also be incorporated. The proportions may be varied widely and it is not necessary that a plasticizer be used. The treatment with hydrogen chloride may also be varied in time, temperature or pressure to obtain products of various degrees of solubility.

It is to be understood that the proportions and ingredients described above in the various examples may be varied considerably without departing from the spirit of the invention. By the term "plasticizer" is meant a material which has a softening action on the resulting halogen containing butadiene body obtained by the action of the halogen or hydrogen halide on the butadiene body containing said plasticizer. By the term "modifier" is meant a material which modifies either by softening or hardening the halogen containing butadiene body.

The invention is, therefore, not limited to the incorporation of plasticizers and solvents with rubber although such are the preferred materials. Thermal plasticizers or materials which are hard at room temperature but softeners for the halogen containing butadiene bodies at elevated temperatures may be incorporated with rubber and are particularly useful where the resulting halogen compound is to be further treated at elevated temperatures such as for molding or milling. Some materials which are hardeners may or may not have plasticizing action on the halogen containing butadiene polymer at elevated temperatures. Materials which have a melting point below that of the halogen containing butadiene polymer in general are of value where the halogen containing butadiene polymer is to be heat treated as by milling, molding or calendering.

I claim:

1. The method which comprises milling rubber and polymerized chloroprene, and subjecting said mixture to a hydrogen halide.

2. A composition of matter comprising a halogen containing rubber derivative and a polymerized chloroprene.

3. A composition of matter comprising a homogeneous mixture of a rubber hydrochloride and a polymerized chloroprene.

4. The method which comprises subjecting a mixture of rubber and polymerized chloroprene to the action of hydrogen chloride for sufficient time and pressure to produce a hydrogen chloride addition product of rubber without appreciably reacting the polymerized chloroprene.

5. The method which comprises subjecting a mixture of rubber and polymerized chloroprene to the action of liquefied hydrogen chloride.

HERBERT A. WINKELMANN.